(12) United States Patent
Kusafuka

(10) Patent No.: US 10,921,588 B2
(45) Date of Patent: Feb. 16, 2021

(54) THREE-DIMENSIONAL DISPLAY APPARATUS, HEAD-UP DISPLAY SYSTEM, AND MOBILE BODY

(71) Applicant: KYOCERA Corporation, Kyoto (JP)

(72) Inventor: Kaoru Kusafuka, Tokyo (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/620,411

(22) PCT Filed: May 29, 2018

(86) PCT No.: PCT/JP2018/020574
§ 371 (c)(1),
(2) Date: Dec. 6, 2019

(87) PCT Pub. No.: WO2018/225585
PCT Pub. Date: Dec. 13, 2018

(65) Prior Publication Data
US 2020/0132993 A1 Apr. 30, 2020

(30) Foreign Application Priority Data
Jun. 8, 2017 (JP) .................................. 2017-113777

(51) Int. Cl.
*G02B 30/30* (2020.01)
*G02B 27/01* (2006.01)

(52) U.S. Cl.
CPC ..... *G02B 27/0101* (2013.01); *G02B 27/0179* (2013.01); *G02B 30/30* (2020.01);
(Continued)

(58) Field of Classification Search
None
See application file for complete search history.

(56) References Cited

U.S. PATENT DOCUMENTS 6,779,892 B2    8/2004  Agostinelli et al.
10,222,625 B2   3/2019  Kasazumi et al.
(Continued)

FOREIGN PATENT DOCUMENTS

JP    2004-062209 A    2/2004
JP    2007-256964 A    10/2007
(Continued)

*Primary Examiner* — Parul H Gupta
(74) *Attorney, Agent, or Firm* — Studebaker & Brackett PC

(57) ABSTRACT

A three-dimensional display apparatus includes a display panel and an optical element. The display panel includes a display surface. The display surface extends in a first direction, extends in a second direction orthogonal to the first direction. The first direction corresponds to a parallax direction of user's eyes seeing an image. The display surface curves around a central axis extending in the second direction. The display surface includes subpixels arranged in a grid pattern in the first direction and the second direction within the display surface. The optical element is arranged along the display surface, and the optical element includes strip-shaped regions, each of which extends in a certain direction. The optical element is configured to define a beam direction of image light emitted from the subpixels. The display surface forms an arc in a cross-section that is orthogonal to the second direction. A position of an eye box, in the first direction, is set to a position within a distance r sin θ from the center of the arc. The r represents a diameter of the arc. The θ represents an angle formed by a linear line connecting between a first direction edge of the display panel and a center of the arc and a linear line connecting between a first direction center of the display panel and the center of the arc viewed in the second direction. The eye box is an acceptable range of a position of the user's eyes when the user sees the image.

10 Claims, 14 Drawing Sheets

(52) U.S. Cl.
CPC .. *G02B 2027/011* (2013.01); *G02B 2027/013* (2013.01); *G02B 2027/0129* (2013.01); *G02B 2027/0187* (2013.01)

(56) References Cited

U.S. PATENT DOCUMENTS

| | | | |
|---|---|---|---|
| 2002/0014589 A1* | 2/2002 | Daimon | G01N 23/227 250/306 |
| 2004/0017546 A1 | 1/2004 | Agostinelli et al. | |
| 2016/0021367 A1* | 1/2016 | Yoon | H04N 13/305 348/59 |
| 2017/0168309 A1 | 6/2017 | Kasazumi et al. | |

FOREIGN PATENT DOCUMENTS

| | | |
|---|---|---|
| JP | 2015-215508 A | 12/2015 |
| WO | 2016/010234 A1 | 1/2016 |

* cited by examiner

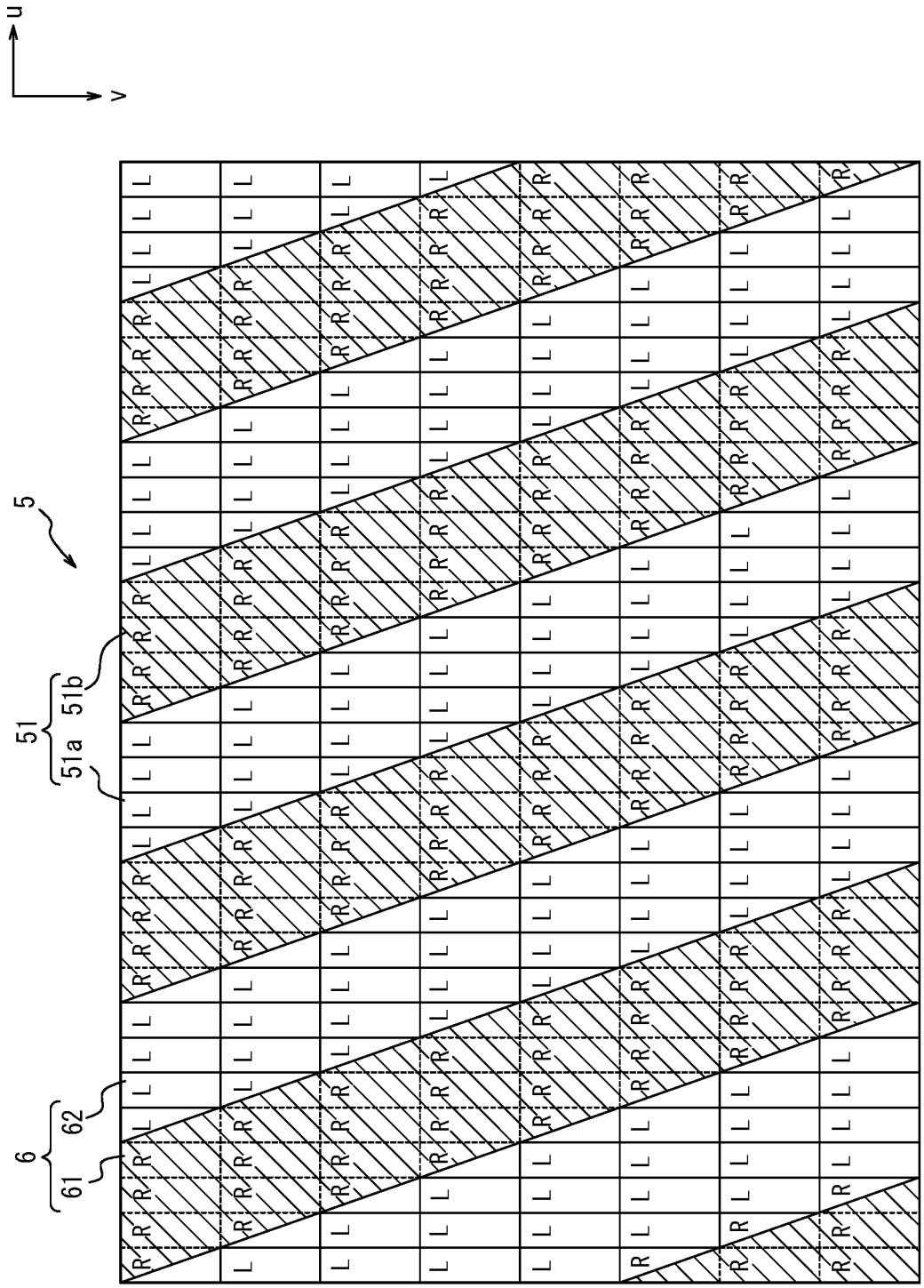

THREE-DIMENSIONAL DISPLAY APPARATUS, HEAD-UP DISPLAY SYSTEM, AND MOBILE BODY

CROSS REFERENCE TO RELATED APPLICATION

This application claims priority to and the benefit of Japanese Patent Application No. 2017-113777 filed on Jun. 8, 2017, the entire contents of which are incorporated herein by reference.

TECHNICAL FIELD

The present disclosure relates to a three-dimensional display apparatus, a head-up display system, and a mobile body.

BACKGROUND

Conventionally, three-dimensional display apparatuses that include an optical element for transmitting a portion of image light emitted from an image display panel to a right eye and another portion of image light emitted from the image display panel to a left eye and display a three-dimensional image without requiring a viewer to wear eyeglasses are known. However, there is a problem that, when such three-dimensional display apparatuses are configured using flat screens, three-dimensional images are often distorted and a field of view may be restricted. As such, PTL 1 set forth below suggests a three-dimensional display apparatus that includes a curved surface in order to suppress distortion and reduce the restriction of the field of view.

CITATION LIST

Patent Literature

PTL 1: JP-A-2004-62209

SUMMARY

A three-dimensional display apparatus according to the present disclosure includes a display panel and an optical element. The display panel includes a display surface that extends in a first direction, extends in a second direction and curves around a central axis that extends in the second direction. The first direction is corresponding to a parallax direction of a user's eyes of a user seeing an image. The second direction is orthogonal to the first direction. The display panel includes subpixels arranged in a grid pattern in the first direction and the second direction in a display surface of the display panel. The optical element is arranged along the display surface, and the optical element includes strip-shaped regions, each of which extends in a certain direction, and is configured to define a beam direction of image light emitted from the subpixels. The display surface forms an arc in a cross-section that is orthogonal to the second direction. A position of an eye box, in the first direction, is set to a position within a distance of $r \sin \theta$ from a center of the arc. The r represents a diameter of the arc. The $\theta$ represents an angle formed by a linear line that connects between a first direction edge of the display panel and the center of the arc and a linear line that connects between a second direction center of the display panel and the center of the arc, when viewed in the second direction. The eye box is an acceptable range of a position of the user's eyes when the user sees the image.

A head-up display system of the present disclosure includes a three-dimensional display apparatus. The three-dimensional display apparatus includes a display panel and an optical element. The display panel includes a display surface that extends in a first direction, extends in a second direction and curves around a central axis that extends in the second direction. The first direction is corresponding to a parallax direction of a user's eyes of a user seeing an image. The second direction is orthogonal to the first direction. The display panel includes subpixels arranged in a grid pattern in the first direction and the second direction in a display surface of the display panel. The optical element is arranged along the display surface, and the optical element includes strip-shaped regions, each of which extends in a certain direction, and is configured to define a beam direction of image light emitted from the subpixels. The display surface forms an arc in a cross-section that is orthogonal to the second direction. A position of an eye box, in the first direction, is set to a position within a distance of $r \sin \theta$ from a center of the arc. The r represents a diameter of the arc. The $\theta$ represents an angle formed by a linear line that connects between a first direction edge of the display panel and the center of the arc and a linear line that connects between a second direction center of the display panel and the center of the arc, when viewed in the second direction. The eye box is an acceptable range of a position of the user's eyes when the user sees the image.

A mobile body according to the present disclosure includes a head-up display system. The head-up display system includes a three-dimensional display apparatus. The three-dimensional display apparatus includes a display panel and an optical element. The display panel includes a display surface that extends in a first direction, extends in a second direction and curves around a central axis that extends in the second direction. The first direction is corresponding to a parallax direction of a user's eyes of a user seeing an image. The second direction is orthogonal to the first direction. The display panel includes subpixels arranged in a grid pattern in the first direction and the second direction in a display surface of the display panel. The optical element is arranged along the display surface, and the optical element includes strip-shaped regions, each of which extends in a certain direction, and is configured to define a beam direction of image light emitted from the subpixels. The display surface forms an arc in a cross-section that is orthogonal to the second direction. A position of an eye box, in the first direction, is set to a position within a distance of $r \sin \theta$ from a center of the arc. The r represents a diameter of the arc. The $\theta$ represents an angle formed by a linear line that connects between a first direction edge of the display panel and the center of the arc and a linear line that connects between a second direction center of the display panel and the center of the arc, when viewed in the second direction. The eye box is an acceptable range of a position of the user's eyes when the user sees the image.

According to embodiments of the present disclosure, an image displayed by the three-dimensional display apparatus that includes a curved display panel can be more appropriately seen.

BRIEF DESCRIPTION OF THE DRAWINGS

In the accompanying drawings:

FIG. 13 is an expanded planar view of a display panel according to an example variation.

DETAILED DESCRIPTION

It is desirable that an image displayed by a conventional three-dimensional display apparatus including curved surface as described above is appropriately recognized.

The present disclosure provides a three-dimensional display apparatus having a curved display panel, a head-up display system, and a mobile body that enable a user to appropriately see an image displayed by the three-dimensional display apparatus.

Hereinafter, embodiments of the present disclosure will be described with reference to the drawings.

Figure 1:
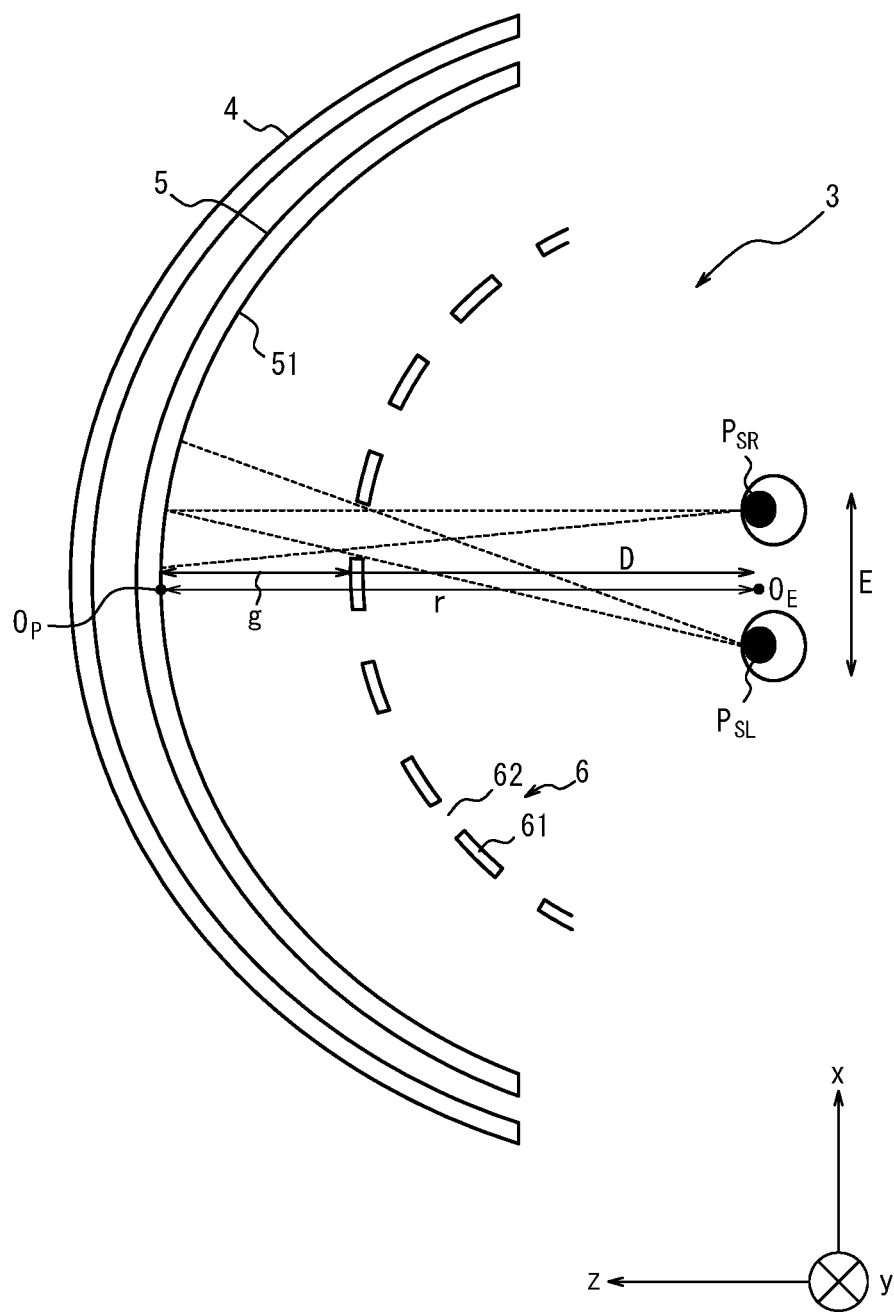
FIG. 1 is a diagram illustrating an example of a three-dimensional display system viewed in a second direction when user's eyes are located at a reference position.

A three-dimensional display apparatus 3 according to the embodiments of the present disclosure includes an emitter 4, a display panel 5, and a parallax barrier 6 configured as an optical element, as illustrated in FIG. 1.

The emitter 4 irradiates the surface of the display panel 5. The emitter 4 may include a light source, a light guide plate, a diffusion plate, a diffusion sheet, and the like. In the emitter 4, the light source is configured to emit light uniformed in a direction of the surface of the display panel 5 by the light guide plate, the diffusion plate, the diffusion sheet, and the like. The emitter 4 is configured to emit homogenized light towards the display panel 5.

As illustrated in FIG. 1, a display surface 51 of the display panel 5 extends in a first direction corresponding to a parallax direction of a user seeing an image and in a second direction orthogonal to the first direction. The display surface 51 curves around the central axis extending in the second direction. The first direction is referred to as an x-axis direction, and the second direction is referred to as a y-axis direction. The display surface 51 has an arc shape in a cross-section that is orthogonal to the second direction. Hereinafter, a direction orthogonal to the first direction and the second direction will be referred to as a third direction. The third direction is referred to as a z-axis direction. The first direction, the second direction, and the third direction may be referred to as a horizontal direction, a vertical direction, and a depth direction, respectively. However, the first direction, the second direction, and the third direction are not limited thereto. The center of the display surface 51 in a first in-plane direction will also be referred to as a panel center $O_P$.

The display panel 5 can be seen by the user from the concave side of the curved surface. The display panel 5 is designed together with the parallax barrier 6 such that the user appropriately sees a three-dimensional image in the vicinity of the panel center $O_P$ in a state in which the users left eye is located at a left reference position $P_{SL}$ and the right eye is located at a right reference position $P_{SR}$. Each of the left reference position $P_{SL}$ and the right reference position $P_{SR}$ is a position of each of the users eyes when a point at a distance r from the panel center $O_P$ to the concave side of the curved surface in the depth direction corresponds to a center $O_E$ between the users eyes (an interocular center). The distance r is a radius r of the arc formed by the display panel 5. Accordingly, the position at the distance r from the panel center $O_P$ in the third direction, i.e., on the concave side of the curved surface corresponds to a center $O_S$ of the arc.

Figure 2:
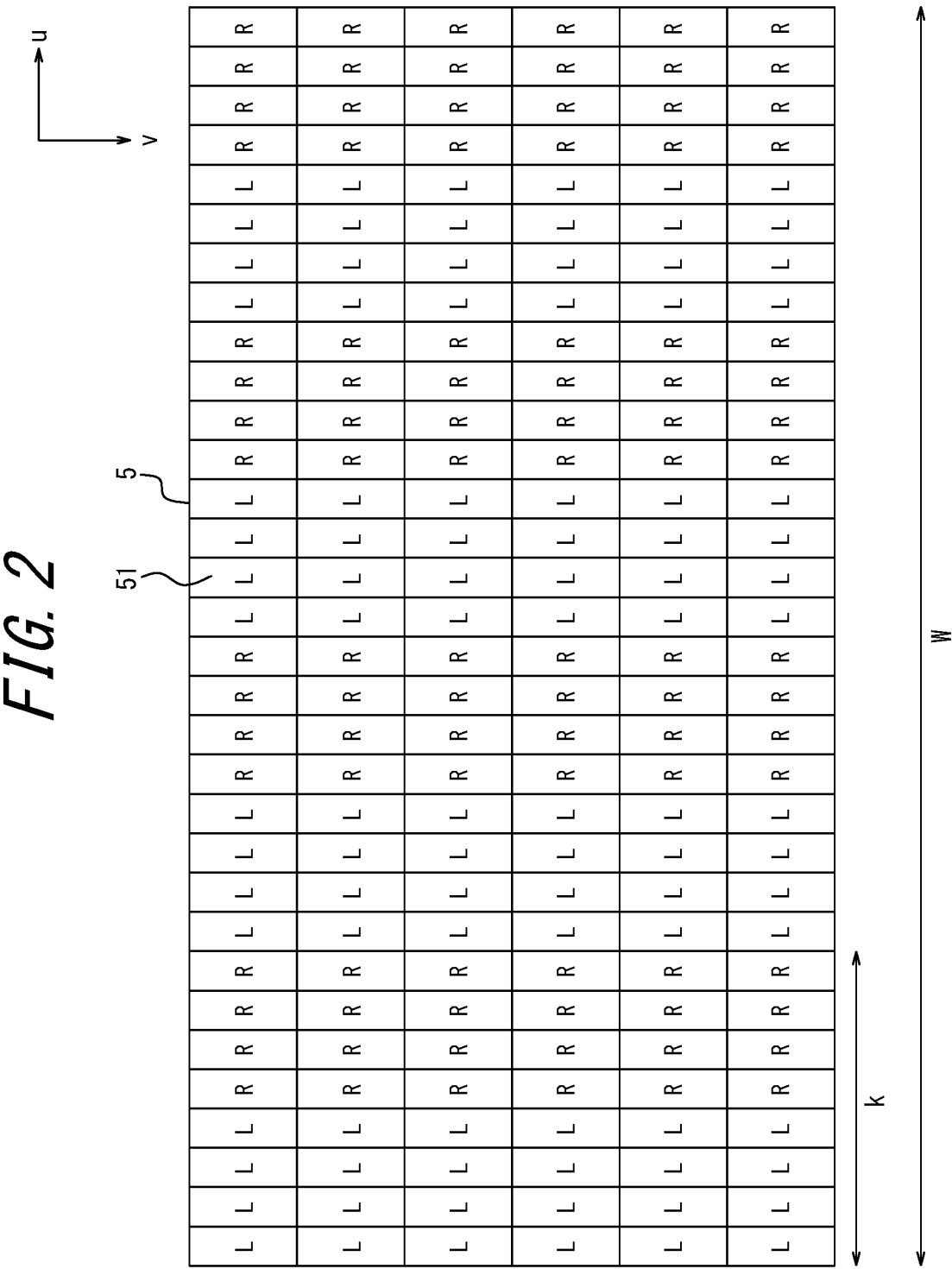
FIG. 2 is an expanded planar view of a display panel illustrated in FIG. 1.

In the display surface 51, a direction corresponding to the first direction is referred to as a first in-plane direction (a u-axis direction) as illustrated in FIG. 2. A direction corresponding to the second direction is referred to as a second in-plane direction (a v-axis direction). As described above, the display surface 51 does not have a curvature in the second direction. Thus, the second in-plane direction can correspond to the second direction. Although the display panel 5 is illustrated as a flat plane in FIG. 2 for convenience of explanation, the display panel 5 actually has a curved surface that is recessed from a user side and curved in the xz plane forming, for example, an arc.

The display surface 51 includes subdivisions arranged in a grid pattern in the first in-plane direction and the second in-plane direction. Each subdivision corresponds to one subpixel. Subpixels are arranged in a grid pattern in the first in-surface direction and the second in-surface direction. Each of the subpixels corresponds to one of the colors R (Red), G (Green), and B (Blue). A combination of three subpixels R, G, and B can constitute one pixel. One pixel may be referred to as one image element. The display surface 51 includes pixels arranged in a grid pattern in the second in-plane direction and the second in-plane direction. The display panel 5 is not limited to a transmitting liquid crystal panel and may be another type of a display panel such as an organic EL display panel. When the display panel 5 is a self-luminous display panel, the emitter 4 may be omitted.

The display surface 51 includes left-subpixel groups. The left-subpixel groups are constituted of n-number of subpixels in columns successively arranged in the second in-plane direction. The left-subpixel groups are configured to display a left-eye image. The display surface 51 includes right-subpixel groups. The right-subpixel groups are constituted of n-number of subpixels in columns successively arranged in the second in-plane direction. The right-subpixel groups are configured to display a right-eye image. The left-subpixel groups and the right-subpixel groups are alternatively arranged in the first in-plane direction. N is an integer of 1 or greater, and n=4 is satisfied in the example illustrated in FIG. 2. Although hereinafter it is assumed that n=4 is satisfied, n may be any integer of 1 or greater. The right-subpixel groups consisting of the n-number of subpixels in columns are alternately arranged with the left-subpixel groups in the first in-plane direction. The subpixels for displaying the left-eye image are represented by L. The subpixels for displaying the right eye image are represented by R.

The left-subpixel groups are arranged at an interval of an image pitch k. The image pitch k is a sum of a first in-plane direction length of the left subpixel group and a first in-plane direction length of the right subpixel group. Because the left subpixel groups and the right subpixel groups are alternately arranged in the first in-plane direction, the image pitch k corresponds also to the intervals of the right subpixel groups.

The parallax barrier 6 is arranged on the opposite side from the emitter 4 with respect to the display panel 5, as illustrated in FIG. 1. The parallax barrier 6 may be arranged on the same side as the emitter 4 with respect to the display panel 5.

The parallax barrier 6 is formed by a curved surface extending along the display surface 51. The parallax barrier 6 is arranged being spaced apart from the display surface 51 by a gap g. The parallax barrier 6 is configured to define a beam direction serving as a propagation direction of image light emitted from each of the subpixels, using each of openings 62 that are formed as strip-shaped areas extending in a certain direction within the curved surface. The openings 62 are portions for transmitting light incident on the parallax barrier 6.

Figure 3:
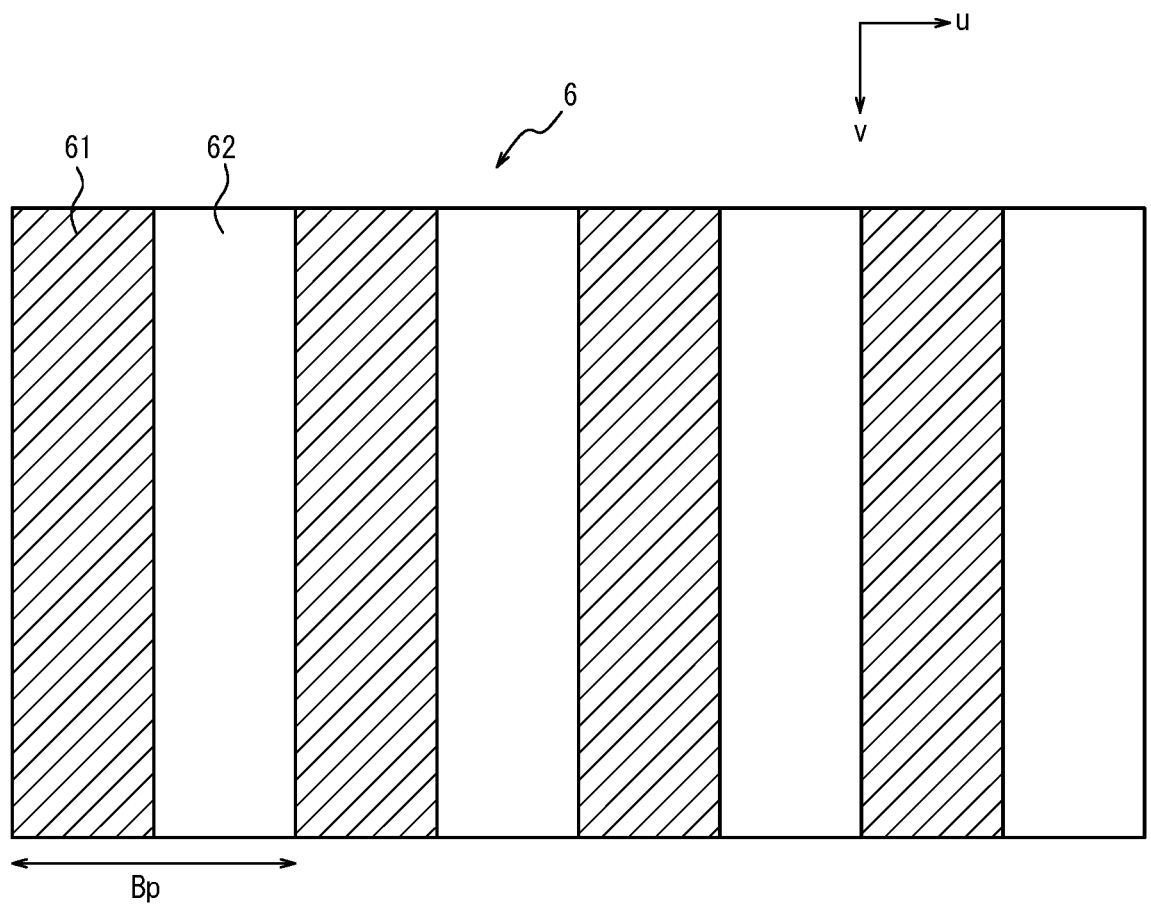
FIG. 3 is an expanded planar view of an optical element illustrated in FIG. 1.

The parallax barrier 6 includes light shielding surfaces 61 extending in a strip-shaped shape in the certain direction as illustrated in FIG. 3. The certain direction is the second direction in the example illustrated in FIG. 3. The light shielding surfaces 61 form light shielding regions of the parallax barrier 6. The light shielding surfaces 61 are configured to shield portions of image light emitted from the subpixels. The light shielding surfaces 61 may shield image light that are to reach the user's right eye, out of image light emitted from the subpixels for displaying the left-eye image. The light shielding surfaces 61 may shield image light that are to reach the user's left eye, out of image light emitted from the subpixels for displaying the right-eye image.

The light shielding surfaces 61 are configured to define an opening 62, together with a light shielding surfaces 61 adjacent to each other. The opening areas 62 and the light shielding surfaces 61 extend in a certain direction in a plane along the display surface 51. The opening areas 62 and the light shielding surfaces 61 are alternately arranged in a repetitive manner in the direction perpendicular to the certain direction. In the present embodiments, the opening areas 62 and the light shielding surfaces 61 extend in the second direction in a plane along the display surface 51. The opening areas 62 and the light shielding surfaces 61 are alternately arranged in a repetitive manner in the first in-plane direction.

The interval between the light shielding surfaces 61 is referred to as a barrier pitch Bp. The barrier pitch Bp is a sum of a length of the light shielding surface 61 in the direction corresponding to the first in-plane direction and a length of the opening 62 in the direction corresponding to the first in-plane direction. Because the light shielding surfaces 61 and the opening 62 are alternately arranged in the direction corresponding to the first in-plane direction, the barrier pitch Bp serves also as the interval between the openings 62.

The openings 62 may transmit light at a transmittance of a first certain value or more. The first certain value may be, for example, 100% or a value approximate thereto. The light shielding planes 61 are portions for shielding the light incident on the parallax barrier 6. In other words, the light shielding planes 61 are configured to shield the image displayed on the three-dimensional display apparatus 3. The light shielding surface 61 may shield light at a transmittance of a second certain value or less. The second certain value may be, for example, 0% or a value approximate thereto. The film may be formed from a resin. The film may be formed from another material. The plate-like member may be formed from a resin or a metal. The plate-like member may be formed from another material. The light shielding surfaces 61 are not limited to a film or a plate-like member and may be formed from a different type member. A base material of the light shielding surfaces 61 may have a light shielding property. The base material of the light shielding surfaces 61 may include a light shielding additive added thereto.

The parallax barrier 6 may be configured as a liquid crystal shutter. The liquid crystal shutter can control light transmittance in accordance with an applied voltage. The liquid crystal shutter may include pixels. The liquid crystal shutter may control the light transmittance of each of the pixels. The liquid crystal shutter may form a high light-transmittance region or a low light-transmittance region in any shape. In a case in which the parallax barrier 6 is configured as a liquid crystal shutter, the openings 62 may be areas having a light transmittance of the first certain value or more. In a case in which the parallax barrier 6 is configured as a liquid crystal shutter, the light shielding surfaces 61 may be areas having a light transmittance of the second certain value or less.

In this way, image light from a subject eye image having passed through the opening areas 62 of the parallax barrier 6 reaches a user's corresponding eye. The subject eye image is an image to be seen by one of the right eye and the left eye serving as a subject eye. A non-subject eye image is an image to be seen by a non-subject eye. When the subject eye is the left eye, the subject-eye image is the left eye image, and the non-subject eye image is the right eye image. When the subject eye is the right eye, the subject-eye image is the right eye image, the non-subject eye image is the left eye image.

For example, image light from the left eye image passes through the openings 62 and reaches the user's left eye. Image light from the right eye image passes through the openings 62 and reaches the user's right eye. Thus, the user's subject eye can see the visible region 51a corresponding to the openings 62.

In the following description, it is assumed that the subject eye is the left eye, the subject eye image is the left eye image, and the non-subject eye image is the right eye image. Thus, the visible region 51a may be described as a region on the display surface 51 seen by the left eye, for convenience of explanation. However, the subject eye is also the right eye, in which case the subject eye image is the right eye image, and the non-subject eye image is the left eye image. The description of the case in which the subject eye is the right eye is similar to the description of the case in which the subject eye is the left eye and thus will be omitted as appropriate.

Figure 4:
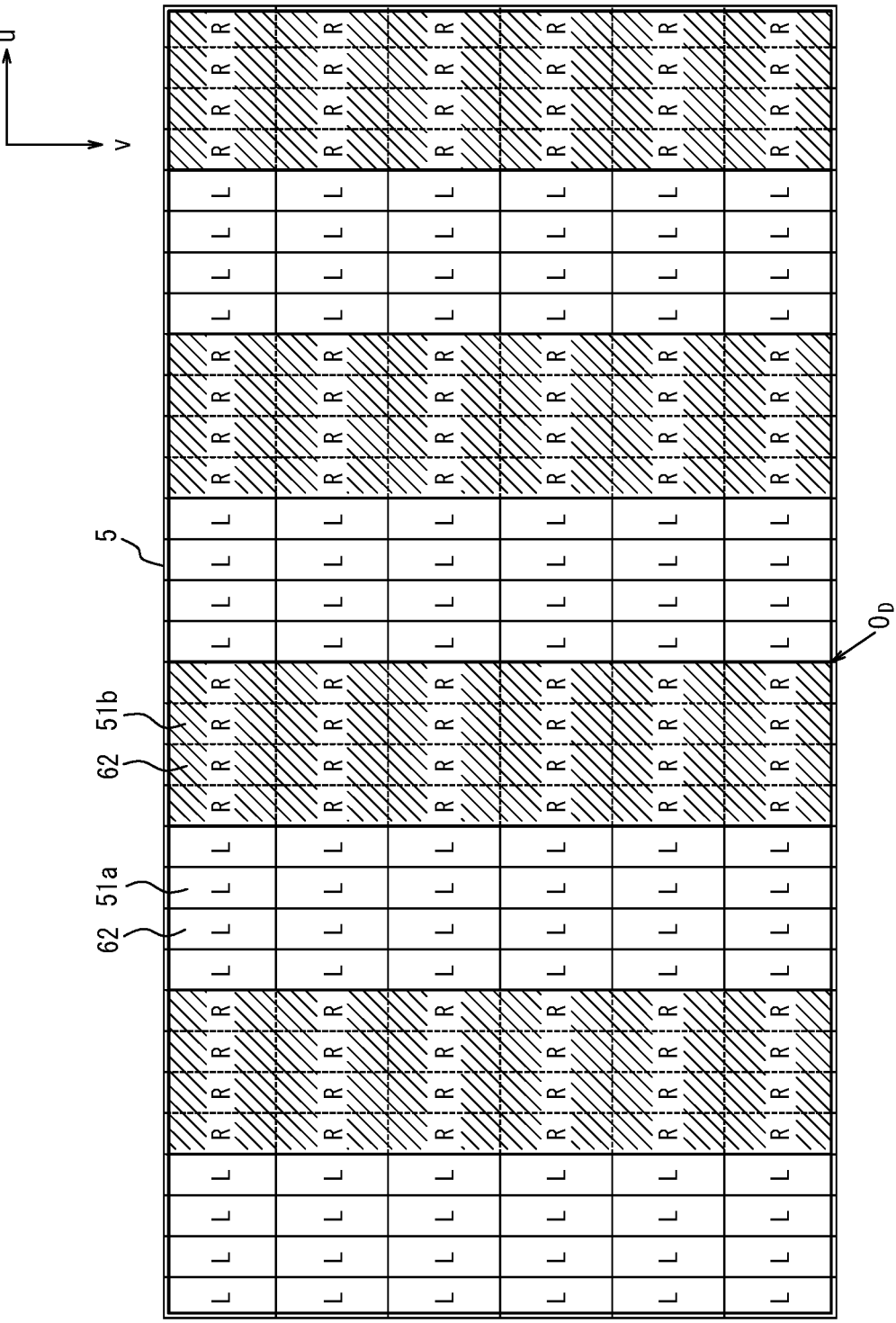
FIG. 4 is an expanded planar view of a three-dimensional display apparatus illustrated in FIG. 1 viewed from an optical element side.

When image light transmitted through the openings 62 of the parallax barrier 6 reaches the user's left eye, the user's left eye can see the visible regions 51a corresponding to the openings 62, as illustrated in FIG. 4. Because image light is blocked by the light shielding surfaces 61 of the parallax barrier 6, the user's left eye cannot see invisible regions 51b corresponding to the light shielding surfaces 61. Thus, when the subpixels in the visible regions 51a respectively display a left-eye image and the subpixels of the invisible regions 51b respectively display a right-eye image, the user's left eye sees the left eye image alone.

Further, when image light from other subpixels transmitted through the openings 62 of the parallax barrier 6 reaches the user's right eye, the user's right eye can see the invisible regions 51b, which cannot be seen by the user's left eye. Because image light is blocked by the light shielding surfaces 61 of the parallax barrier 6, the user's right eye cannot see the visible regions 51a that can be seen by the user's left eye. Thus, when the subpixels in the visible regions 51a display the left-eye image and the subpixels in the invisible regions 51b display the right-eye image as described above, the user's right eye sees the right-eye image alone. That is, the user's left-eye sees the left-eye image alone, and the user's right eye sees the right-eye image alone. The user sees a three-dimensional image because of the parallax between the left-eye image and the right-eye image.

As illustrated in FIG. 1, the display panel 5 and the parallax barrier 6 are designed using an interocular distance E, which is a distance between the user's eyes. The display panel 5 and the parallax barrier 6 are designed such that the user can appropriately see a three-dimensional image in the vicinity of the panel center $O_P$ in a state in which the user's left eye and right eye are located at the left reference position $P_{SL}$ and the right reference position $P_{SR}$, respectively. The display panel 5 and the parallax barrier 6 are designed such that a total of an optimum distance D and the gap g corresponds to the curvature r of the arc. The optimum distance D is a distance between the center of the direction corresponding to the first in-plane direction of the parallax barrier 6 and the interocular center $O_E$ and minimizes the occurrence of crosstalk. A viewing distance d corresponds to the optimum distance D when the users left eye and right eye are located at the left reference position $P_{SL}$ and the right reference position $P_{SR}$, respectively. The viewing distance d is a distance between the center of the direction corresponding to the first in-plane direction of the parallax barrier 6 and the interocular center $O_E$. Thus, when the interocular center $O_E$ is located at the center $O_S$ of the arc, the users left eye and right eye are located at the left reference position $P_{SL}$ and the right reference position $P_{SR}$, respectively.

An eye box needs to be defined such that a three-dimensional image formed by the three-dimensional display apparatus is appropriately seen in the entire display surface 51, rather than just in the vicinity of the panel center $O_P$. The eye box is a range of a position of the users eyes that enables the users eyes to appropriately see a three-dimensional image on the entire display surface 51. Hereinafter, the eye box of the three-dimensional display apparatus 3 having the above configuration will be described. Hereinafter, W represents a first in-plane length of the display panel 5. As described above, r represents the curvature of the arc formed by the display panel 5. When viewed in the vertical direction, an angle formed by a line connecting between the panel center $O_P$ and the center of the arc formed in the xz plane by the display panel 5 and a line connecting between an edge of the display panel 5 and the center of the arc is expressed by $\theta = W/2r$.

Horizontal Position of Eye Box (1)

Figure 5:
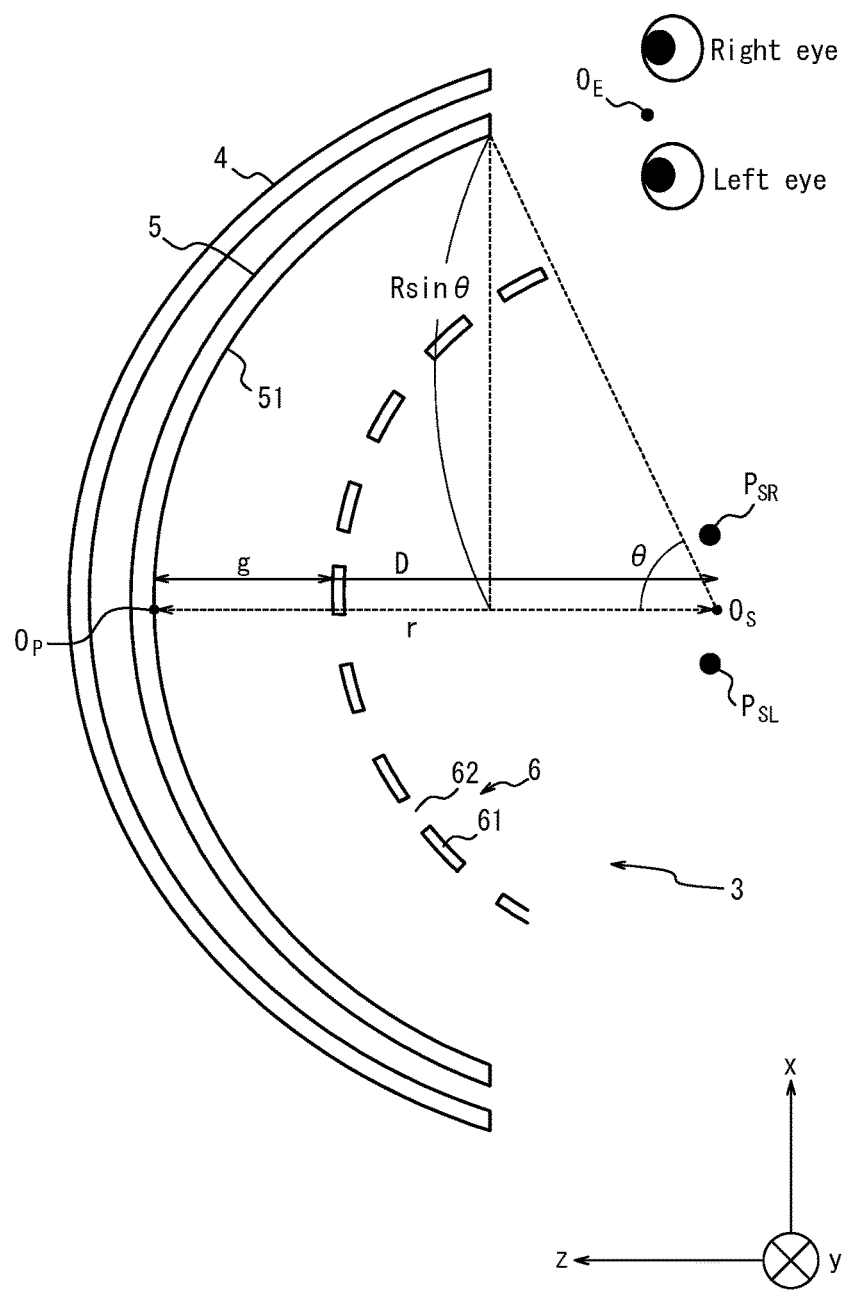
FIG. 5 is a diagram illustrating an example in which the user's eyes displaced from a reference position in a horizontal direction and the three-dimensional display apparatus are seen in the second direction.

When at least one of the users left eye and right eye is located at a position longer than the distance $r \sin \theta$ in the horizontal direction from the center $O_S$ of the arc as illustrated in FIG. 5, the at least one of the users left eye and right eye cannot appropriately see the display surface 51 of the display panel 5. In the example illustrated in FIG. 5, the users right eye is located at a position longer than the distance $r \sin \theta$ from the center $O_S$ of the arc and thus cannot see the image in the vicinity of the right-side edge of the display panel 5. Thus, by setting the eye box to a position within the distance $r \sin \theta$ in the horizontal direction from the center $O_S$ of the arc, a three-dimensional image formed by the three-dimensional display apparatus 3 can be appropriately seen.

Depth-Direction Position of Eye Box (1)

Figure 6:
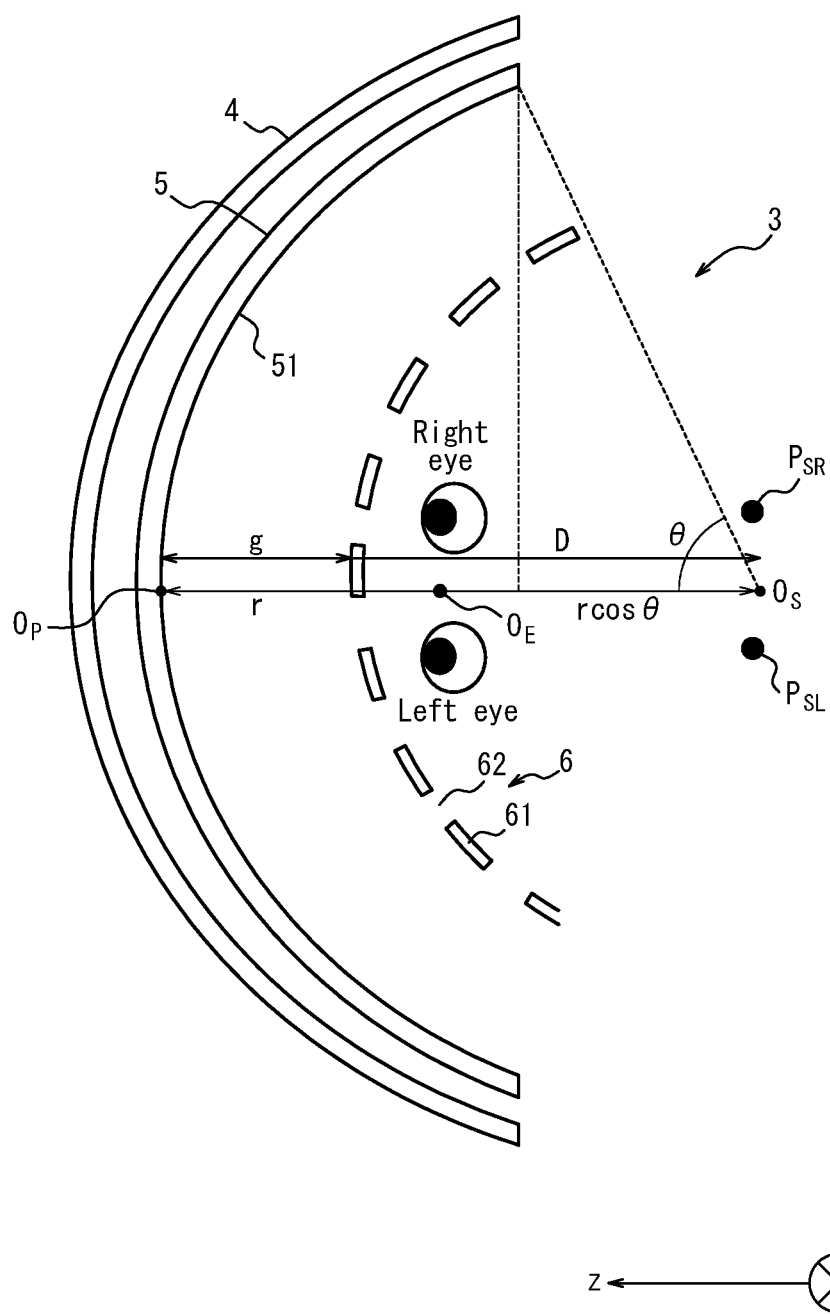
FIG. 6 is a diagram illustrating an example in which the user's eyes displaced from the reference position in a direction approaching the three-dimensional display apparatus and the three-dimensional display apparatus are viewed in the vertical direction.

When the users left eye and right eye are located at a position shorter than a distance $r - r \cos \theta$ from the panel center $O_P$ toward the center $O_S$ of the arc as illustrated in FIG. 6, the users left eye and right eye cannot see the vicinity of the edge of the display surface 51 of the display panel 5. Thus, by setting the eye box to a position at or longer than the distance $r - r \cos \theta$ from the panel center $O_P$ toward the arc center $O_S$, a three-dimensional image formed by the three-dimensional display apparatus 3 can be appropriately seen.

Depth-Direction Position of Eye Box (2)

Next, a depth-direction position of the eye box in a direction separating from the display surface 51 will be described with reference to FIG. 7.

Here, the visible regions 51a on the display surface 51 according to the present embodiments will be described in detail. In the following description, the visible regions 51a corresponding to the left eye will be referred to as left visible regions 51aL. Out of the left visible regions 51aL, those located in the vicinity of the panel center $O_P$ will be referred to as 51aL(1). Out of the left visible regions 51aL, those located remote from the panel center $O_P$ will be referred to as 51aL(2). Similarly, the visible regions 51a corresponding to the right eye will be referred to as right visible regions 51aR. Out of the right visible regions 51aR, those located in the vicinity of the panel center $O_P$ will be referred to as 51aR(1). Out of the right visible regions 51aR, those located remote from the panel center $O_P$ will be referred to as 51aR(2).

Figure 7:
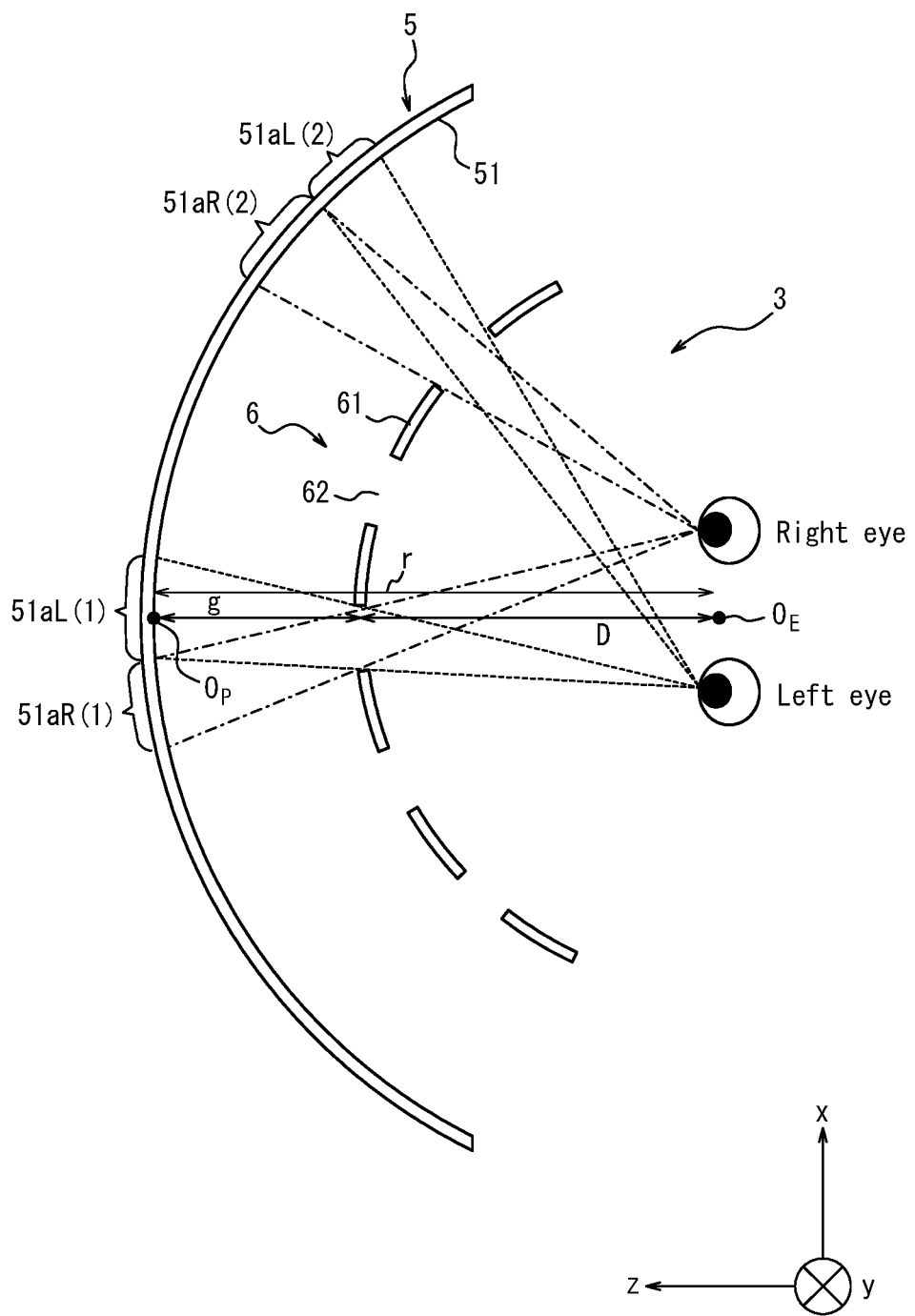
FIG. 7 is a schematic diagram for explaining a visible region when the user's eyes are located at the reference position.

When the users eyes are located at a position where the viewing distance d corresponds to the optimum distance D as illustrated in FIG. 7, the left eye visible region 51aL includes a maximum number of the left eye images and a minimum number of the right eye images. At this time, the right eye visible region 51aR includes a maximum number of the right eye images and a minimum number of left eye images. The right eye visible regions 51aR corresponds to the invisible regions 51b of the left eye.

Figure 8:
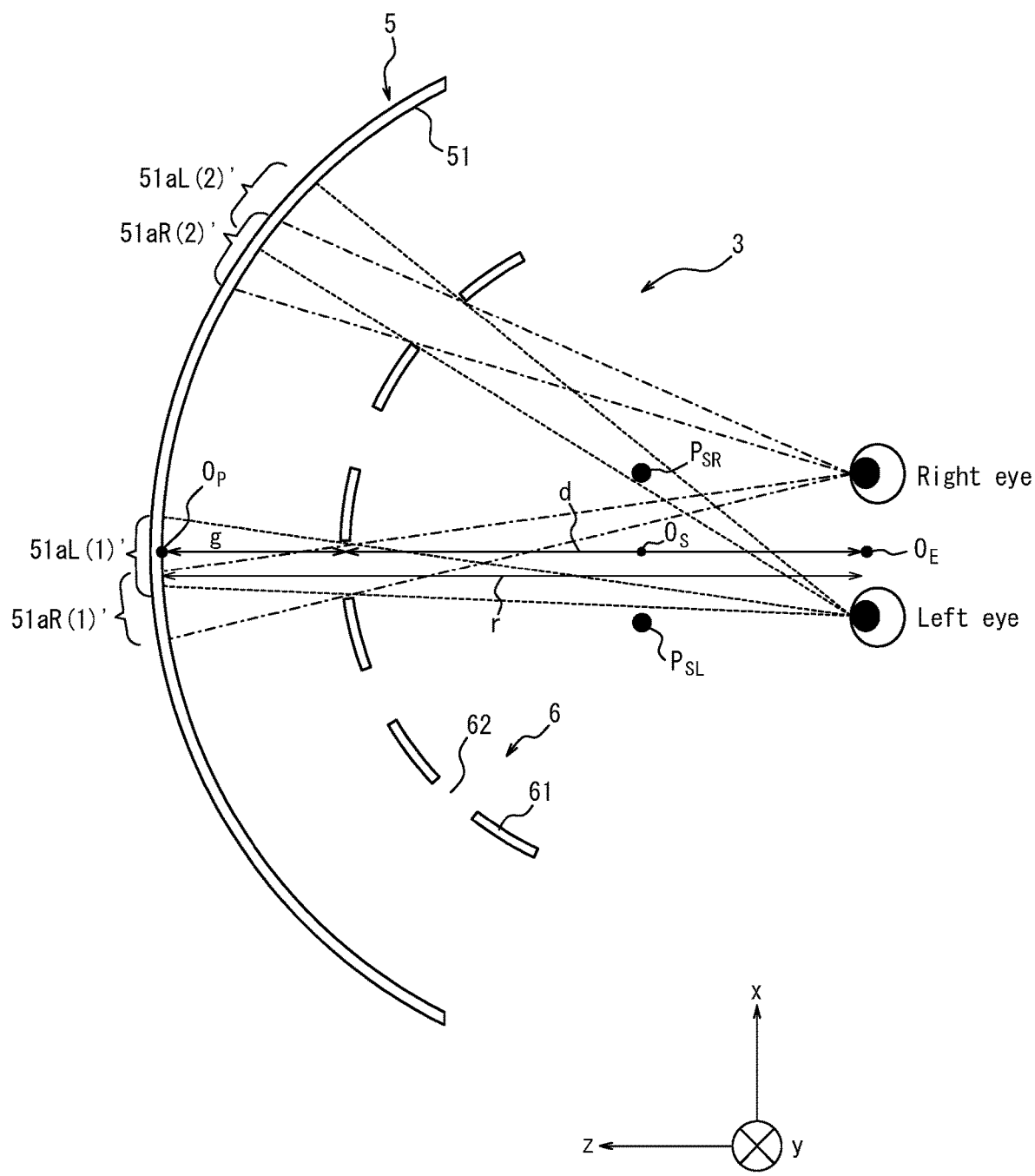
FIG. 8 is a schematic diagram for explaining a visible region when the user's eyes are displaced in a depth direction.

When the users eyes are located at a position where the viewing distance d is longer than the optimum distance D as illustrated in FIG. 8, a portion of the left visible region 51aL(1)' and a portion of the right visible region 51aR(1)' that are close to the panel center $O_P$ overlap with each other. Each of the left visible region 51aL and the right visible region 51aR in a case in which the user's left eye and right eye are displaced in the depth direction from the left reference position $P_{SL}$ and the right reference position $P_{SR}$, respectively, are denoted with an apostrophe "'". Similarly, a portion of the left visible region 51aL(2)' and a portion of the right visible region 51aR(2)' that are remote from the panel center $O_P$ overlap with each other. The overlapping portion between the left visible region 51aL(2)' and the right visible region 51aR(2)' is larger than the overlapping portion between the left visible region 51aL(1)' and the right visible region 51aR(1)'. Thus, the closer to the edge of the display panel 5 the left visible region 51aL' and the right visible region 51aR' are located, the larger the overlapping area between the left visible region 51aL' and the right visible region 51aR'.

In a case in which the left eye image is displayed by subpixels included in the overlapping area between the left visible region 51aL' and the right visible region 51aR', the right eye sees the left eye image. In a case in which the right eye image is displayed by these subpixels, the left eye sees the right eye image. Thus, it will be difficult to suppress the occurrence of crosstalk, regardless of which one of the left eye image and the right eye image is displayed by these subpixels.

The eye box needs to be set to a position that enables the entire visible region 51a of the display surface 51 to be appropriately seen. When the user's eyes are located at a position where the viewing distance d is longer than the optimum D as described above, as more remote from the panel center $O_P$ in the horizontal direction of the display surface 51 an image is displayed, that is, as closer to the edge of the display surface 51 the image is located, the more difficult for the user to appropriately see the image. Thus, in order that the entire visible region 51a is appropriately seen, it is necessary to set the position of the eye box within a range where the left visible region 51aL(2) and the right visible region 51aR(2) that are the most remote from the panel center $O_P$ can be seen appropriately. By setting the position of the eye box as described above, the entire visible region 51a of the display surface 51 can be appropriately seen by the user's eyes located within the eye box.

As such, the eye box is set to a position in the depth direction where the visible region 51a which is the closest to the edge of the display surface 51 includes at least a certain number of subpixels for displaying the subject eye image in the horizontal direction. For example, the eye box may include at least a certain number of columns of the subpixels for displaying the left eye image in an area of the left visible region 51aL(2)' that does not overlap with the right visible region 51aR(2)'. The certain number is, for example, (n−1).

Such a position of the eye box which includes at least the (n−1) number of columns of the subpixels within the area of the left visible region 51aL that does not overlap with the right visible region 51aR(N) is a position where the viewing distance d satisfies the formula (1) set forth below. In the formula (1), W represents a first in-plane direction length of the display surface 51, E represents the interocular distance as described above, and D represents the optimum distance.

[Equation 1]

$$d \leq \frac{W}{2} \times \frac{D}{\frac{W}{2} - (2n-1) \times \frac{E}{n}} \quad \text{Formula (1)}$$

In the present embodiments, the radius r of the arc formed by the display panel 5 is designed to correspond to the optimum distance D of the panel center $O_P$. Thus, when the viewing distance d satisfies the formula (2) set forth below, the user can appropriately see a three-dimensional image formed by the three-dimensional display apparatus 3. Accordingly, when the position of the interocular center $O_E$ corresponds to a position at the viewing distance d expressed by the formula (2) from the panel center $O_P$, the user can appropriately see the three-dimensional image formed by the three-dimensional display apparatus 3.

[Equation 2]

$$d \leq \frac{W}{2} \times \frac{r}{\frac{W}{2} - (2n-1) \times \frac{E}{n}} \quad \text{Formula (2)}$$

Although the certain number is (n−1) as described above by way of example, this is not restrictive. For example, the certain number may be n/2. For example, the certain number may be 1.

Horizontal Position of Eye Box (2)

Figure 9A:
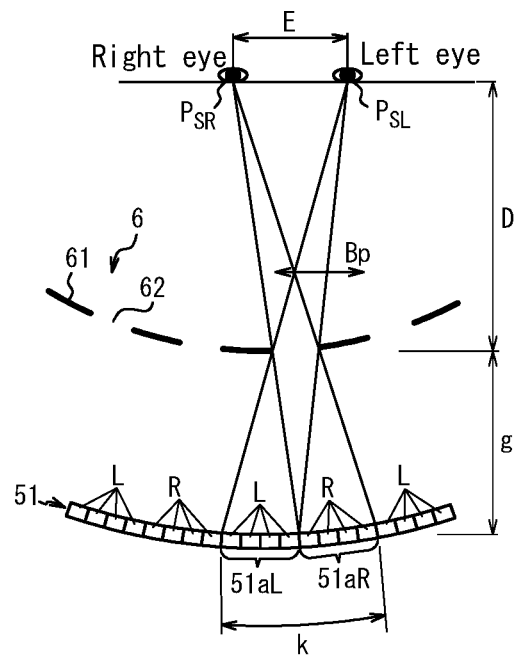
FIG. 9A is a schematic diagram for explaining the visible region when the user's eyes are located at the reference position.

When the users left eye and right eye are located at the left reference position $P_{SL}$ and the right reference position $P_{SR}$, respectively, as illustrated in FIG. 9A, the left visible region 51aL includes the maximum number of the left eye images and the minimum number of the right eye images. The right visible region 51aR that can be seen by the users right eye includes the maximum number of the right eye images and the minimum number of the left eye images. The right visible region 51aR corresponds to the invisible area 52aL of the left eye.

Figure 9B:
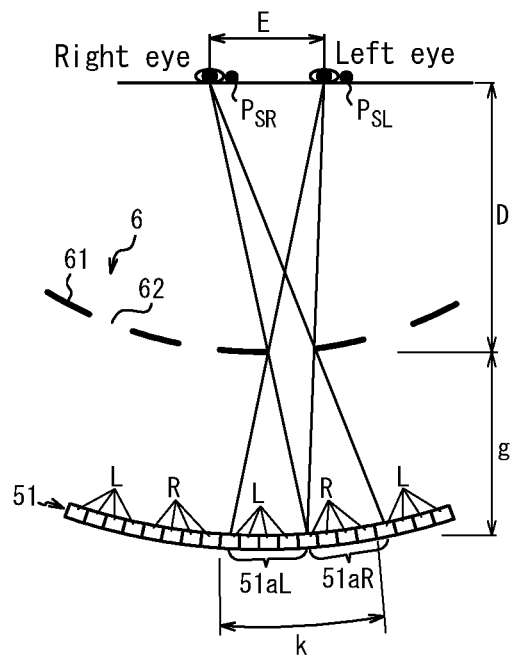
FIG. 9B is a schematic diagram for explaining a visible region when the user's eyes are displaced by less than E/n from the reference position.

When the users left eye and right eye are displaced in the horizontal direction to a position less than the distance E/n from the left reference position $P_{SL}$ and the right reference position $P_{SR}$, respectively, as illustrated in FIG. 9B, the left visible region 51aL includes all of the subpixels in the (n−1)-number of columns for displaying the left eye image. The left visible region 51aL includes part of the subpixels in one column for displaying the left eye image. The left visible region 51aL includes part of the subpixels in one column for displaying the right eye image. Similarly, the right visible region 51aR includes all of the subpixels in the (n−1) columns for displaying the right eye image. The right visible region 51aR includes part of the subpixels in one column for displaying the right eye image. The right visible region 51aR includes part of the subpixels in one column for displaying the right eye image. Thus, crosstalk occurs in the image seen by the users eyes.

Figure 9C:
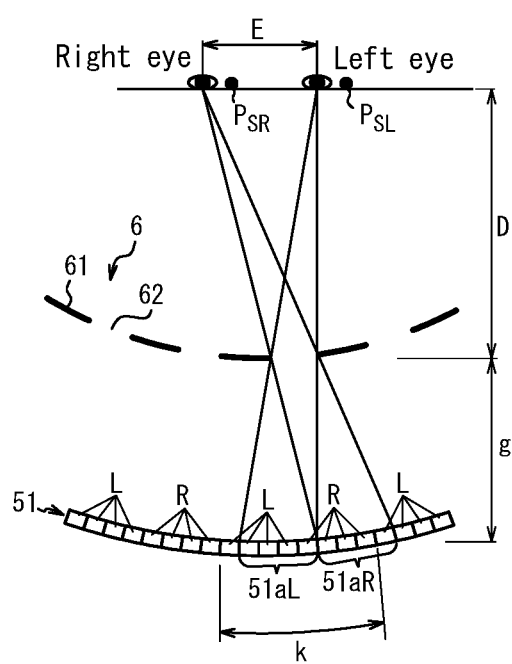
FIG. 9C is a schematic diagram for explaining a visible region when the user's eyes are displaced by E/n from the reference position.

When the users left eye and right eye are displaced to a position at the distance E/n from the left reference position $P_{SL}$ and the right reference position $P_{SR}$, respectively, as illustrated in FIG. 9C, the left visible region 51aL includes all of the subpixels in the (n−1)-columns for displaying the left eye image. Also, the left visible region 51aL includes all of the subpixels in one column for displaying the right eye image. In this case, crosstalk stronger than that of the case illustrated in FIG. 9B occurs. In order to suppress the occurrence of crosstalk, it is necessary to change the images such that the subpixels displaying the right eye image newly included in the left visible region 51aL display the left eye image. In order to enable the user to see the image with suppressed crosstalk without changing the image, the horizontal position of the eye box needs to be less than the distance E/n from the left reference position $P_{SL}$ and the right reference position $P_{SR}$.

Curvature of Arc

Figure 10:
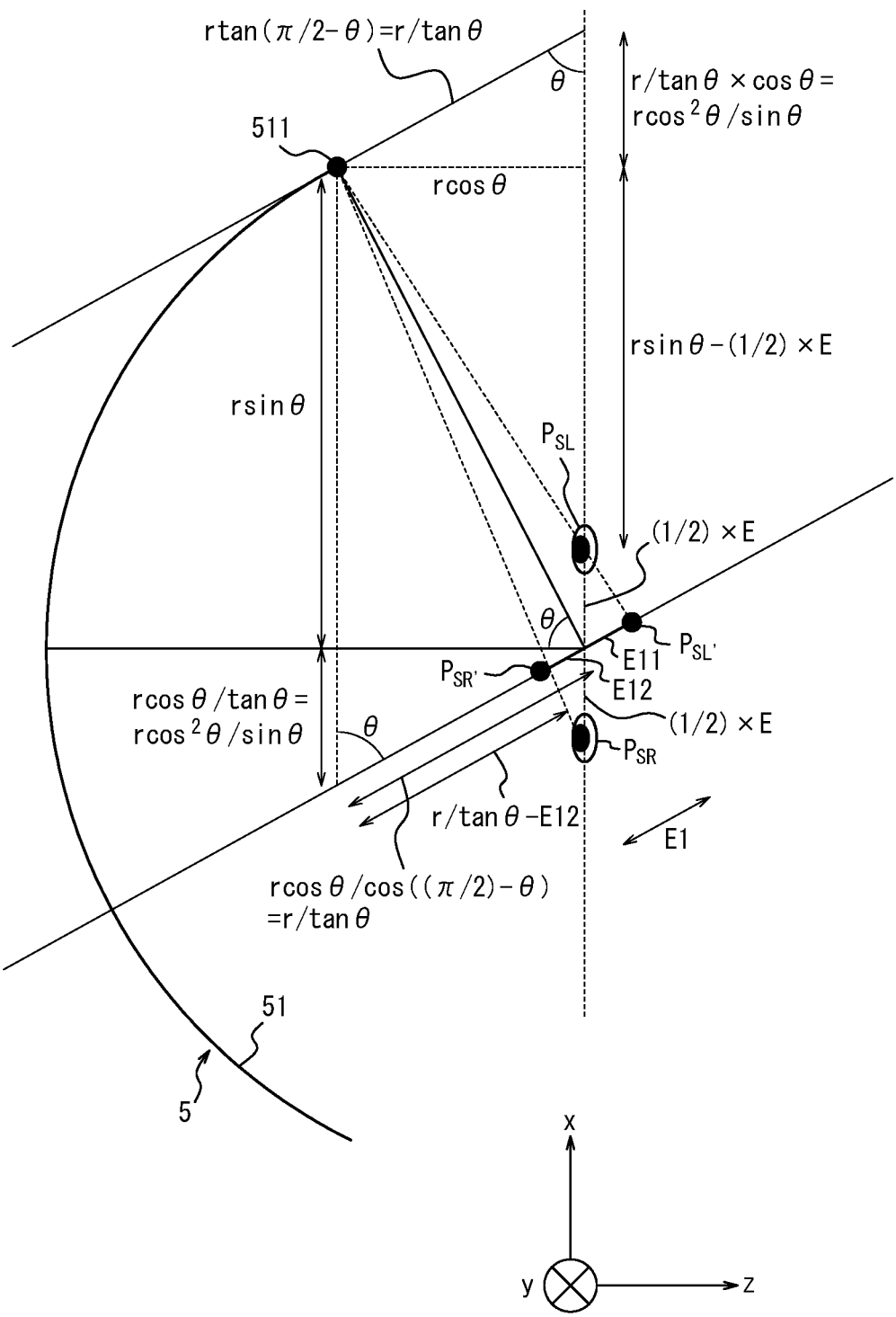
FIG. 10 is a schematic diagram for explaining an edge interocular distance.

As already explained above, the display panel 5 and the parallax barrier 6 are designed using the interocular distance E such that the user can appropriately see a three-dimensional image displayed in the vicinity of the panel center $O_P$ in a state in which the user's left eye and the right eye located at the left reference position $P_{SL}$ and the right reference position $P_{SR}$, respectively. When the user sees the edge 511 of the display panel 5 while the face is directed to the panel center $O_P$, a user's substantial interocular distance E1 (hereinafter, referred to as an edge interocular distance E1) with respect to the edge 511 is shorter than the interocular distance E, as illustrated in FIG. 10. When the three-dimensional display apparatus 3 is designed using the interocular distance E such that the user can appropriately see a three-dimensional image displayed in the vicinity of the panel center $O_P$, the user's eye can also appropriately see a three-dimensional image displayed at the edge 511.

The edge interocular distance E1 is a distance between a left projection position $P_{SL}'$ and a right projection position $P_{SR}'$, as illustrated in FIG. 10. The left projection position $P_{SL}'$ is a position for projecting the left reference position $P_{SL}$ to a line that is parallel to a tangential line of the display panel 5 at the edge 511 and passes through the interocular center $O_E$. The right projection position $P_{SR}'$ is a position for projecting the right reference position $P_{SR}$ to the line that is parallel to the tangential line of the display panel 5 at the edge 511 and passes through the interocular center $O_E$.

The three-dimensional display apparatus 3 is designed such that an image is appropriately seen with respect to the interocular distance E. Thus, at the edge interocular distance E1 which is substantially shorter than the interocular distance E, the left visible region 51aL and the right visible region 51aR overlap with each other. In particular, when the edge interocular distance E1 is shorter than the interocular distance E by E/n, an image of one subpixel is included in both the left visible region 51aL and the right visible region 51aR. Thus, the left eye and the right eye see the same subpixel, causing crosstalk in the user's eyes. In order to suppress the occurrence of crosstalk, the difference between the interocular distance E and the edge interocular distance E1 needs to be less than E/n as expressed by the formula (3) set forth below.

$$E - E1 < E/n \quad \text{Formula (3)}$$

The edge interocular distance E1 is expressed by the formula (4) set forth below using the distance E11 between the left projection position $P_{SL}'$ and the interocular center $O_E$ and the distance E12 between the right projection position $P_{SR}'$ and the interocular center $O_E$, as illustrated in FIG. 10.

$$E1 = E11 + E12 \quad \text{Formula (4)}$$

The distance E11 between the left projection position $P_{SL}'$ and the interocular center $O_E$ is expressed by the formula (5) set forth below.

[Equation 3]

$$E11: \frac{1}{2}E = \frac{r}{\tan\theta} : \frac{r\cos^2\theta}{\sin\theta} + r\sin\theta - \frac{1}{2}E \quad \text{Formula (5)}$$

The distance E12 between the right projection position $P_{SR}'$ and the interocular center $O_E$ is expressed by the formula (6) set forth below.

[Equation 4]

$$E12: \frac{1}{2}E = \frac{r}{\tan\theta} - E12 : r\sin\theta + \frac{r\cos^2\theta}{\sin\theta} \quad \text{Formula (6)}$$

By defining the radius r of the arc and the angle θ such that the formulas (3) to (6) are satisfied, the user can appropriately see an image displayed at any positions from the center to the edge in the horizontal direction of the display panel 5. Because θ=W/2r is satisfied as described above, by defining the first in-plane direction length W of the display surface 51, r and θ are uniquely defined. Because the radius r of the arc is defined as described above, the curvature 1/r is defined.

Although the above embodiments have been described as a representative example, it will be apparent to those skilled in the art that various modifications and substitutions can be made within the spirit and scope of the present disclosure. Thus, the above embodiments should not be construed as limiting the present disclosure and may be varied or changed in a variety of manners without departing from the scope of the appended claims. For example, constituent blocks descried in the embodiments may be combined into one constituent block, or one constituent block may be subdivided into constituent blocks.

Figure 11:
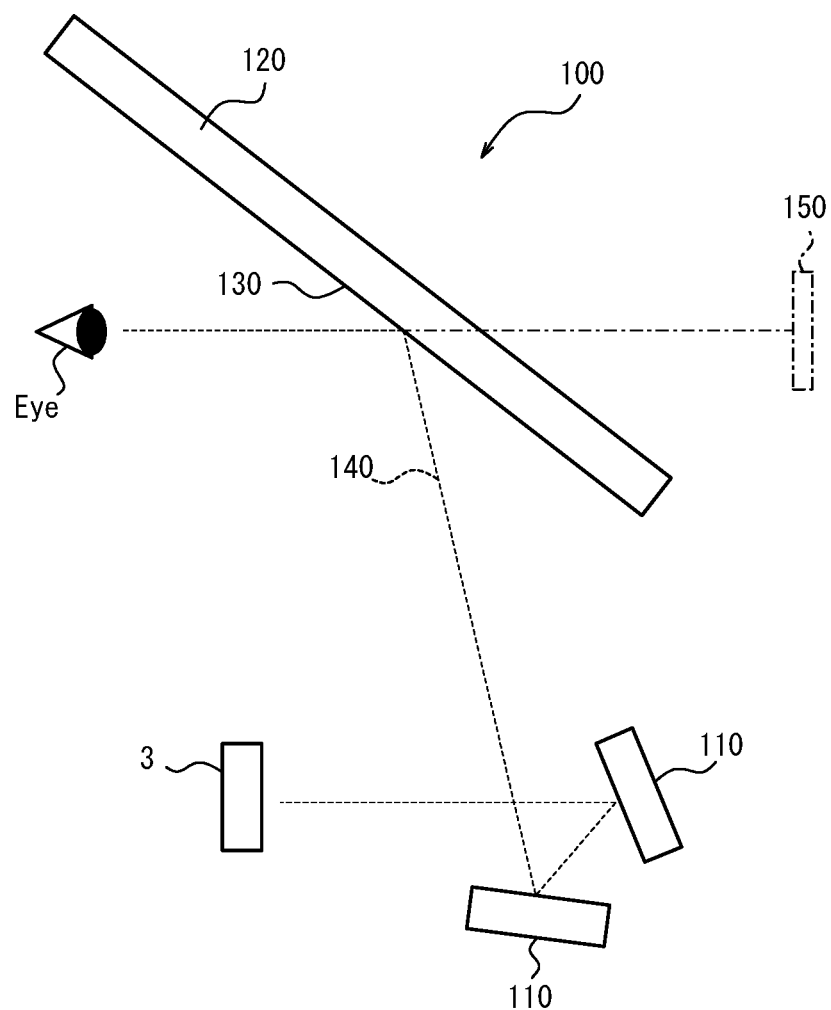
FIG. 11 is a diagram illustrating an example of a HUD that includes the three-dimensional display apparatus according to the present embodiment.

In the above embodiments, the three-dimensional display apparatus 3 may be mounted in a head-up display system 100 as illustrated in FIG. 11. The head-up display system 100 may be also referred to as a HUD (Head-Up Display) 100. The HUD 100 includes the three-dimensional display apparatus 3, an optical member 110, and a projected member 120 that includes a projected surface 130. The HUD 100 is configured to transmit image light emitted from the three-dimensional display system 1 to the projected member 120 via the optical member 110. The HUD 100 causes image light reflected by the projected member 120 to reach the user's left and right eyes. That is, the HUD 100 causes image light from the three-dimensional display apparatus 3 to proceed to the user's left and right eyes along an optical path 140, which is indicated by a broken line. The user can perceive image light reached along the optical path 140 as a virtual image 150. The three-dimensional display apparatus 3 can provide a stereoscopic image by controlling the display in accordance with positions of the user's left and right eyes.

Figure 12:
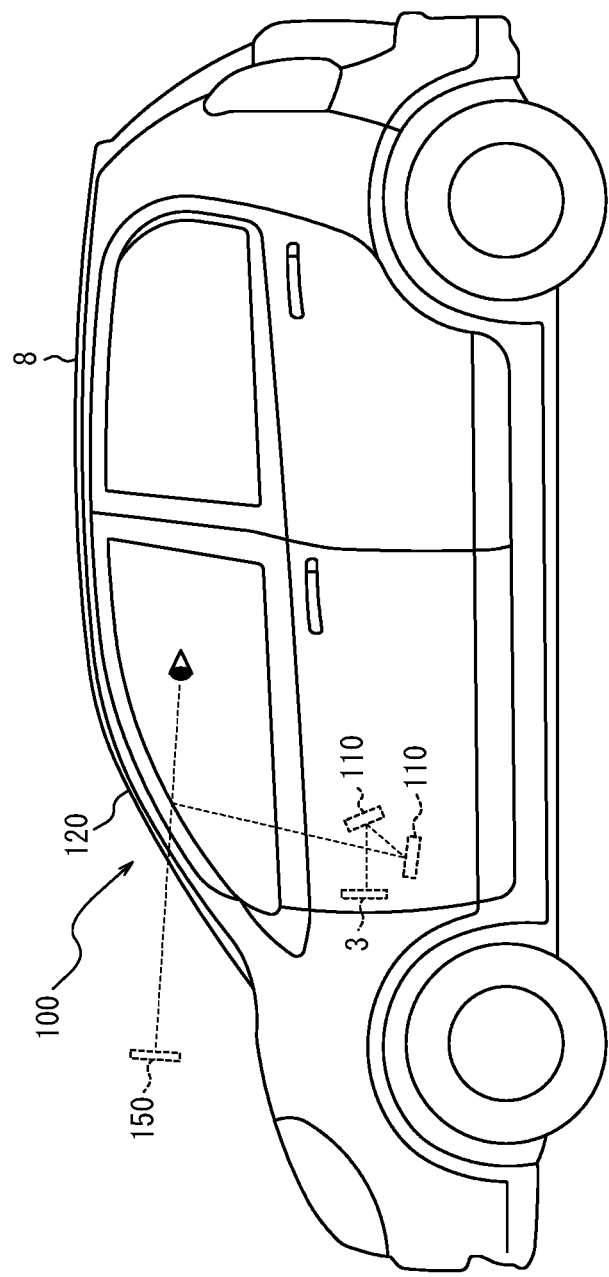
FIG. 12 is a diagram illustrating an example of a mobile body having the HUD illustrated in FIG. 11 mounted therein.

In the above embodiments, also, the HUD 100 may be mounted in a mobile body as illustrated in FIG. 12. Some constituent elements of the HUD 100 may be shared by another apparatus or used as another constituent element of the mobile body. For example, the mobile body may use the windshield also as the projected member 120. When some constituent elements are shared by another apparatus or used as another constituent element of the mobile body, another configuration may be referred to as a HUD module or a three-dimensional display component. The three-dimensional display apparatus 3 may be mounted in a mobile body.

The term "mobile body" used herein may encompass, for example, vehicles, ships, and aircrafts. Vehicles may include automobiles and industrial vehicles. Vehicles are not limited thereto but may include rail vehicles, domestic vehicles, and fixed-wing aircrafts that travel on a runway. Automobiles may include, for example, cars, trucks, buses, motorcycles, and trolley buses. Automobiles are not limited thereto but may include other automobiles that travels on the road. Industrial vehicles may include, for example, agricultural vehicles and construction vehicles. Industrial vehicles may include, for example, forklifts and golf carts. Industrial vehicles for agricultural purpose may include, for example, tractors, tillers, transplanters, binders, combined harvesters, and lawn mowers. Industrial vehicles for construction purposes may include, for example, bulldozers, scrapers, excavators, crane trucks, dump trucks, and load rollers. The vehicles may include human-power vehicles traveling on human power. Classification of the vehicles is not limited to the above. For example, vehicles may include industrial vehicles authorized to travel on the road, and categories may include the same type of vehicle. Vessels may include, for example, watercrafts, boats, and tankers. Aircraft may include, for example, fixed wing aircraft and rotorcraft.

In the above embodiments, although the certain direction in which the light shielding surfaces 61 of the parallax barrier 6 that have a strip-shaped shape and extend corresponding to the second direction as illustrated in FIG. 4, this is not restrictive. For example, the certain direction may be a direction having a certain angle other than 0 degrees with respect to the second direction. When the lines indicating the edges of the openings 62 extend in the second direction, there may be a case in which a moiré pattern occurs between an opening pattern of the parallax barrier 6 and a pixel pattern displayed by the display panel 5. When the lines indicating the edges of the openings 62 extend in a certain direction at a certain angle other than 0 degrees with respect to the second in-plane direction, the occurrence of the moiré pattern is reduced in a displayed image.

REFERENCE SIGNS LIST

3 three-dimensional display apparatus
4 irradiator
5 display panel
6 parallax barrier
8 mobile body
51 display surface
51*a* visible region
51*b* invisible region
61 light shielding surface
62 opening
100 head-up display system
110 optical member
120 projected member
130 projected surface
140 optical path
150 virtual image

The invention claimed is:
1. A three-dimensional display apparatus comprising:
a display panel including a display surface that extends in a first direction, extends in a second direction orthogonal to the first direction, curves around a central axis extending in the second direction, and includes subpixels arranged in a grid pattern in the first direction and the second direction within the display surface, the first direction is corresponding to a parallax direction of a user's eyes of a user seeing an image; and an optical element that is arranged along the display surface, and the optical element includes strip-shaped regions, each of which extends in a certain direction, and is configured to define a beam direction of image light emitted from the subpixels, wherein the display surface forms an arc in a cross-section that is orthogonal to the second direction, wherein a position of an eye box, in the first direction, is set to a position within a distance r sin θ from the center of the arc, where r represents a diameter of the arc and θ represents an angle formed by a linear line connecting between a first direction edge of the display panel and a center of the arc and a linear line connecting between a first direction center of the display panel and the center of the arc viewed in the second direction, and the eye box is an acceptable range of a position of the user's eyes when the user sees the image, wherein the eye box is set to the position, in a third direction orthogonal to the first direction and the second direction, where a certain number or more of subpixels for displaying a subject eye image are included in the first direction in a visible region most remote in the first direction from the center of the display panel on the display surface, and wherein, when L represents a length of the display panel in a first in-plane direction corresponding to the first direction of the display surface, n represents the number of subpixels that are continuously arranged in the first in-plane direction and display the subject eye image, and E represents an interocular distance between the user's eyes, a distance d of the eye box from the center of the display surface satisfies the following equation:

[Equation 1]

$$d \leq \frac{W}{2} \times \frac{r}{\frac{W}{2} - (2n-1) \times \frac{E}{n}}.$$

2. The three-dimensional display apparatus according to claim 1,
wherein the eye box is set to the position, in the third direction orthogonal to the first direction and the second direction, equal to or longer than a distance r−r cos θ toward the center of the arc from the center of the display panel.

3. The three-dimensional display apparatus according to claim 1,
wherein a curvature of the arc is located such that (n−1)-number or more subpixels displaying a subject eye image are included in a visible region that is most remote in the first direction from the first direction center of the display surface.

4. The three-dimensional display apparatus according to claim 3,
wherein the curvature of the arc satisfies:

$E - E1 < E/n,$ $E1 = E11 + E12,$

[Equation 2]

$E11 : \frac{1}{2}E = \frac{r}{\tan\theta} : \frac{r\cos^2\theta}{\sin\theta} + r\sin\theta - \frac{1}{2}E,$ and

[Equation 3]

$E12 : \frac{1}{2}E = \frac{r}{\tan\theta} - E12 : r\sin\theta + \frac{r\cos^2\theta}{\sin\theta}.$ 5. A head-up display system comprising:
a three-dimensional display apparatus that includes:
   a display panel including a display surface that extends in a first direction, extends in a second direction orthogonal to the first direction, curves around a central axis extending in the second direction, and includes subpixels arranged in a grid pattern in the first direction and the second direction within the display surface, the first direction is corresponding to a parallax direction of user's eyes seeing an image; and
   an optical element that is arranged along the display surface and, the optical element includes strip-shaped regions, each of which extends in a certain direction, and is configured to define a beam direction of image light emitted from the subpixels,
   wherein the display surface forms an arc in a cross-section that is orthogonal to the second direction,
   wherein a position of an eye box, in the first direction, is set to a position within a distance r sin θ from the center of the arc, where r represents a diameter of the arc and θ represents an angle formed by a linear line connecting between a first direction edge of the display panel and a center of the arc and a linear line connecting between a first direction center of the display panel and the center of the arc viewed in the second direction, and the eye box is an acceptable range of a position of the user's eyes when the user sees the image,
   wherein the eye box is set to the position, in a third direction orthogonal to the first direction and the second direction, where a certain number or more of subpixels for displaying a subject eye image are included in the first direction in a visible region most remote in the first direction from the center of the display panel on the display surface, and
   wherein, when L represents a length of the display panel in a first in-plane direction corresponding to the first direction of the display surface, n represents the number of subpixels that are continuously arranged in the first in-plane direction and display the subject eye image, and E represents an interocular distance between the user's eyes, a distance d of the eye box from the center of the display surface satisfies the following equation:

[Equation 1]

$d \leq \frac{W}{2} \times \frac{r}{\frac{W}{2} - (2n-1) \times \frac{E}{n}}.$

6. The head-up display system according to claim 5,
wherein a curvature of the arc is located such that (n−1)-number or more subpixels displaying a subject eye image are included in a visible region that is most remote in the first direction from the first direction center of the display surface.

7. The head-up display system according to claim 6,
wherein the curvature of the arc satisfies:

$E - E1 < E/n,$ $E1 = E11 + E12,$

[Equation 2]

$E11 : \frac{1}{2}E = \frac{r}{\tan\theta} : \frac{r\cos^2\theta}{\sin\theta} + r\sin\theta - \frac{1}{2}E,$ and

[Equation 3]

$E12 : \frac{1}{2}E = \frac{r}{\tan\theta} - E12 : r\sin\theta + \frac{r\cos^2\theta}{\sin\theta}.$ 8. A mobile body comprising:
a head-up display system provided with a three-dimensional display apparatus that includes:
   a display panel including a display surface that extends in a first direction, extends in a second direction orthogonal to the first direction, the display panel curves around a central axis extending in the second direction, and the display panel includes subpixels arranged in a grid pattern in the first direction and the second direction within the display surface, the first direction is corresponding to a parallax direction of user's eyes seeing an image; and
   an optical element that is arranged along the display surface and, the optical element includes strip-shaped regions, each of which extends in a certain direction, and is configured to define a beam direction of image light emitted from the subpixels,
   wherein the display surface forms an arc in a cross-section that is orthogonal to the second direction,
   wherein a position of an eye box, in the first direction, is set to a position within a distance r sin θ from the center of the arc, where r represents a diameter of the arc and θ represents an angle formed by a linear line connecting between a first direction edge of the display panel and a center of the arc and a linear line connecting between a first direction center of the display panel and the center of the arc viewed in the second direction, and the eye box is an acceptable range of a position of the user's eyes when the user sees the image,
   wherein the eye box is set to the position, in a third direction orthogonal to the first direction and the second direction, where a certain number or more of subpixels for displaying a subject eye image are included in the first direction in a visible region most remote in the first direction from the center of the display panel on the display surface, and wherein, when L represents a length of the display panel in a first in-plane direction corresponding to the first direction of the display surface, n represents the number of subpixels that are continuously arranged in the first in-plane direction and display the subject eye image, and E represents an interocular distance between the user's eyes, a distance d of the eye box from the center of the display surface satisfies the following equation:

[Equation 1]

$$d \leq \frac{W}{2} \times \frac{r}{\frac{W}{2} - (2n-1) \times \frac{E}{n}}.$$

9. The mobile body according to claim 8,
wherein a curvature of the arc is located such that (n−1)-number or more subpixels displaying a subject eye image are included in a visible region that is most remote in the first direction from the first direction center of the display surface.

10. The mobile body according to claim 9,
wherein the curvature of the arc satisfies:

$$E - E1 < E/n,$$

$$E1 = E11 + E12,$$

[Equation 2]

$$E11 : \frac{1}{2}E = \frac{r}{\tan\theta} : \frac{r\cos^2\theta}{\sin\theta} + r\sin\theta - \frac{1}{2}E, \text{ and}$$

[Equation 3]

$$E12 : \frac{1}{2}E = \frac{r}{\tan\theta} - E12 : r\sin\theta + \frac{r\cos^2\theta}{\sin\theta}.$$

* * * * *